(12) United States Patent
Wu

(10) Patent No.: US 8,665,810 B2
(45) Date of Patent: Mar. 4, 2014

(54) METHOD OF PERFORMING UPLINK TRANSMISSION AND RELATED COMMUNICATION DEVICE

(75) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 179 days.

(21) Appl. No.: 13/118,562

(22) Filed: May 30, 2011

(65) Prior Publication Data

US 2011/0299486 A1    Dec. 8, 2011

Related U.S. Application Data

(60) Provisional application No. 61/351,300, filed on Jun. 4, 2010.

(51) Int. Cl.
*H04W 4/00* (2009.01)

(52) U.S. Cl.
USPC .......................................................... 370/329

(58) Field of Classification Search
USPC .................. 370/328–350, 468, 469
See application file for complete search history.

(56) References Cited

U.S. PATENT DOCUMENTS

| | | | |
|---|---|---|---|
| 8,243,697 B2 * | 8/2012 | Lee et al. ....................... | 370/336 |
| 2010/0002630 A1 * | 1/2010 | Park et al. ..................... | 370/328 |
| 2010/0098012 A1 | 4/2010 | Bala | |
| 2010/0118746 A1 | 5/2010 | Gerlach | |
| 2011/0134774 A1 * | 6/2011 | Pelletier et al. ................ | 370/252 |

FOREIGN PATENT DOCUMENTS

| | | |
|---|---|---|
| EP | 2254381 A1 | 11/2010 |
| GB | 2461378 A | 1/2010 |
| KR | 1020100126231 A | 12/2010 |
| WO | 2009113816 A2 | 9/2009 |
| WO | 2010019679 A2 | 2/2010 |
| WO | 2010027035 A1 | 3/2010 |
| WO | 2010048178 A1 | 4/2010 |

OTHER PUBLICATIONS

3GPP TS 36.321 v9.2.0, Mar. 2010.
3GPP TSG-RAN WG2 Meeting #70 R2-103427, "Stage 2 description of Carrier Aggregation", May 2010.
European patent application No. 11004498.9, European Search Report mailing date: Sep. 5, 2011.
Nokia Siemens Networks (Rapporteur), "Stage 2 description of Carrier Aggregation", 3GPP TSG-RAN WG2 Meeting #69, R2-101985, 12th-16th Apr. 2010, Beijing, China, XP050422506, p. 1-16.
Nokia Siemens Networks (Rapporteur), "Stage 2 description of Carrier Aggregation", 3GPP TSG-RAN WG2 Meeting #69, R2-103291, 10th-14th May 2010, Montreal, Canada, XP050423405, p. 1-18.

(Continued)

*Primary Examiner* — Frank Duong
(74) *Attorney, Agent, or Firm* — Winston Hsu; Scott Margo

(57) ABSTRACT

A method of performing uplink transmission for a mobile device configured with a primary component carrier and at least one secondary component carrier in a wireless communication system is disclosed. The method comprises steps of receiving a first uplink grant for transmission in a subframe; receiving a second uplink grant in a Random Access Response message for transmission on the primary component carrier in the subframe; and performing transmission in the subframe according to which of the primary component carrier and the at least one secondary component carrier the first uplink grant is received for.

16 Claims, 5 Drawing Sheets

(56) References Cited

OTHER PUBLICATIONS

LG Electronics Inc., "Issues with Scheduling Request Procedure", 3GPP TSG-RAN WG2 #61bis, R2-081597, Mar. 31-Apr. 4, 2008, Shenzhen, China, XP050139326, p. 1-4.
Office Action mailed on Oct. 31, 2012 for the Korean application No. 10-2011-0053797, filing date Jun. 3, 2011, pp. 1-2.
Office Action mailed on Feb. 19, 2013 for the Japanese Application No. 2011-125652, filing date Jun. 3, 2011, pp. 1-4.
Samsung Electronics, Random Access in CA, 3GPP TSG-RAN WG2 #69bis, R2-102261, Apr. 12-16, 2010, Beijing, China, p. 1-2.
Office action mailed on Jun. 18, 2013 for the China application No. 201110149188.2, filing date: Jun. 3, 2011, p. 1-8.
Office action mailed on Sep. 23, 2013 for Taiwan application No. 100119183, filing date Jun. 1, 2011, p. 1-7.

* cited by examiner

METHOD OF PERFORMING UPLINK TRANSMISSION AND RELATED COMMUNICATION DEVICE

CROSS REFERENCE TO RELATED APPLICATIONS

This application claims the benefit of U.S. Provisional Application No. 61/351,300, filed on Jun. 4, 2010 and entitled "Method and Apparatus for uplink transmission in a wireless communication system", the contents of which are incorporated herein by reference.

BACKGROUND OF THE INVENTION

1. Field of the Invention

The present invention relates to a method used in a wireless communications system and related communication device, and more particularly, to a method of performing uplink transmission in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as to user equipments (UEs).

In the LTE system, a user equipment (UE) may perform measurement to measure communication quality, such as quality of a frequency layer or strength of a radio signal, which is controlled by the E-UTRAN, due to mobility of the UE. Measurement can be divided into two types according to the current operating frequency of the UE, which are an intra-frequency measurement and an inter-frequency/inter-RAT measurement. The intra-frequency measurement is predominantly performed for the mobility within the same frequency layer (i.e. between cells with the same carrier frequency), whereas the inter-frequency/inter-RAT measurement is predominantly performed for the mobility between different frequency layers (i.e. between cells with a different carrier frequency). In addition, the inter-frequency/inter-RAT measurement is performed during uplink/downlink idle periods, such as a measurement gap configured by the network. During the measurement gap, both the uplink and downlink transmissions are prohibited, and thereby the inter-frequency/inter-RAT measurement can be performed within the measurement gap.

A long term evolution-advanced (LTE-A) system, as its name implies, is an evolution of the LTE system. The LTE-A system targets faster switching between power states, improves performance at a cell edge, and includes subjects, such as bandwidth extension, coordinated multipoint transmission/reception (COMP), UL multiple-input multiple-output (MIMO), etc.

For bandwidth extension, carrier aggregation is introduced to the LTE-A system by which two or more component carriers are aggregated to achieve a wider-band transmission. Accordingly, the LTE-A system can support a wider bandwidth up to 100 MHz by aggregating a maximum number of 5 component carriers, where bandwidth of each component carrier is 20 MHz and is backward compatible with 3GPP Rel-8. An LTE-A specification supports carrier aggregation for both continuous and non-continuous component carriers with each component carrier limited to a maximum of 110 resource blocks. The carrier aggregation increases a bandwidth flexibility by aggregating the non-continuous component carriers. A component carrier is used as an UL component carrier or a downlink (DL) component carrier. Further, there is a one-to-one correspondence between the UL component carrier and the DL component carrier, i.e., each UL component carrier is paired with a corresponding DL component carrier. In an LTE-A time-division duplex (TDD) system, the UL component carrier and DL component carrier are the same component carrier.

When the UE is configured with the carrier aggregation (CA), the UE is allowed to receive and transmit data on one or multiple component carriers to increase the data rate. In the LTE-A system, it is possible for the eNB to configure the UE different numbers of UL and DL component carriers which depend on UL and DL aggregation capabilities, respectively. Moreover, the component carriers configured to the UE necessarily consists of one DL primary component carrier (PCC) and one UL primary component carrier. Component carriers other than the primary component carriers are named UL or DL secondary component carriers (SCCs). The numbers of UL and DL secondary component carriers are arbitrary, and are related to the UE capability and available radio resource. The UL and DL primary component carriers are used for establishing and re-establishing the radio resource control (RRC), and transmitting and receiving the system information. The UL or DL primary component carrier can not be de-activated, but can be changed by a handover procedure with the RACH procedure. However, component carriers on which the UE can perform the RACH procedure have not been known and the process of changing UL or DL primary component carrier can not be completed without performing the RACH procedure.

According to the specification released by 3rd Generation Partnership Project (3GPP), if the UE receives both a grant in a Random Access Response and a grant for its Cell Radio Network Temporary Identifier (C-RNTI) or Semi persistent scheduling (SPS) C-RNTI requiring transmissions in the same UL subframe (i.e. transmission time interval (TTI)), the UE may choose to continue with either the grant for its RA-RNTI or the grant for its C-RNTI or Semi persistent scheduling C-RNTI.

However, if the UE is configured with a primary component carrier and at least one secondary component carrier (i.e. corresponding to a PCell and at least a SCell, respectively), the UE may receive a first uplink grant on a PDCCH for a secondary component carrier during a random access procedure on the primary component carrier and receive a second uplink grant in a Random Access Response message for transmissions in a same subframe. Under such a situation, the UE either chooses the first uplink grant on PDCCH or the second uplink grant in the Random Access Response message for transmission in the subframe, which is not efficient since only one transmission is allowed while the first uplink grant and the second uplink grant are for different component carriers, i.e. the secondary component carrier and the primary component carrier respectively.

On the other hand, according to the specification released by 3GPP, when a configured uplink grant (i.e. an SPS grant) is indicated during a measurement gap and indicates an UL-SCH transmission during a measurement gap, the UE processes the configured grant but does not transmit on an Uplink Shared Channel (UL-SCH), i.e. processing the SPS grant for transmission information but not transmitting corresponding data.

However, if the UE is configured with a primary component carrier and at least one secondary component carrier (i.e. corresponding to a PCell and at least a SCell, respectively), the UE may have a measurement gap configuration for a secondary component carrier and a configured uplink grant indicating an UL-SCH transmission during the measurement gap for the primary component carrier since the UE may have different measurement gap configurations for different component carriers. Under such a situation, the UE does not perform the UL-SCH transmission. No transmission wastes the configured uplink grant resources since the measurement gap and the configured uplink grant occupy different frequency resources.

SUMMARY OF THE INVENTION

The disclosure therefore provides a method and related communication device for performing uplink transmission.

A method of performing uplink transmission for a mobile device configured with a primary component carrier and at least one secondary component carrier in a wireless communication system is disclosed. The method comprises steps of receiving a first uplink grant for transmission in a subframe; receiving a second uplink grant in a Random Access Response message for transmission on the primary component carrier in the subframe; and performing transmission in the subframe according to which of the primary component carrier and the at least one secondary component carrier the first uplink grant is received for.

A method of performing uplink transmission for a mobile device configured with at least two component carriers and a measurement gap in a wireless communication system is disclosed. The method comprises steps of receiving an uplink resource for transmission on a first component carrier of the at least two component carriers in a subframe comprising the measurement gap; processing the uplink resource; and transmitting a data using the uplink resource in the subframe according to which of the at least two component carriers the measurement gap is configured for.

A communication device of a wireless communication system for performing uplink transmission is disclosed. The communication device is configured with a primary component carrier and at least one secondary component carrier, and comprises means for receiving a first uplink grant for transmission in a subframe; means for receiving a second uplink grant in a Random Access Response message for transmission on the primary component carrier in the subframe; and means for performing transmission in the subframe according to which of the primary component carrier and the at least one secondary component carrier the first uplink grant is received for.

A communication device of a wireless communication system for performing uplink transmission is disclosed. The communication device is configured with a primary component carrier and at least one secondary component carrier, and comprises means for receiving an uplink resource for transmission on a first component carrier of the at least two component carriers in a subframe comprising the measurement gap; means for processing the uplink resource; and means for transmitting a data using the uplink resource in the subframe according to which of the at least two component carriers the measurement gap is configured for.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
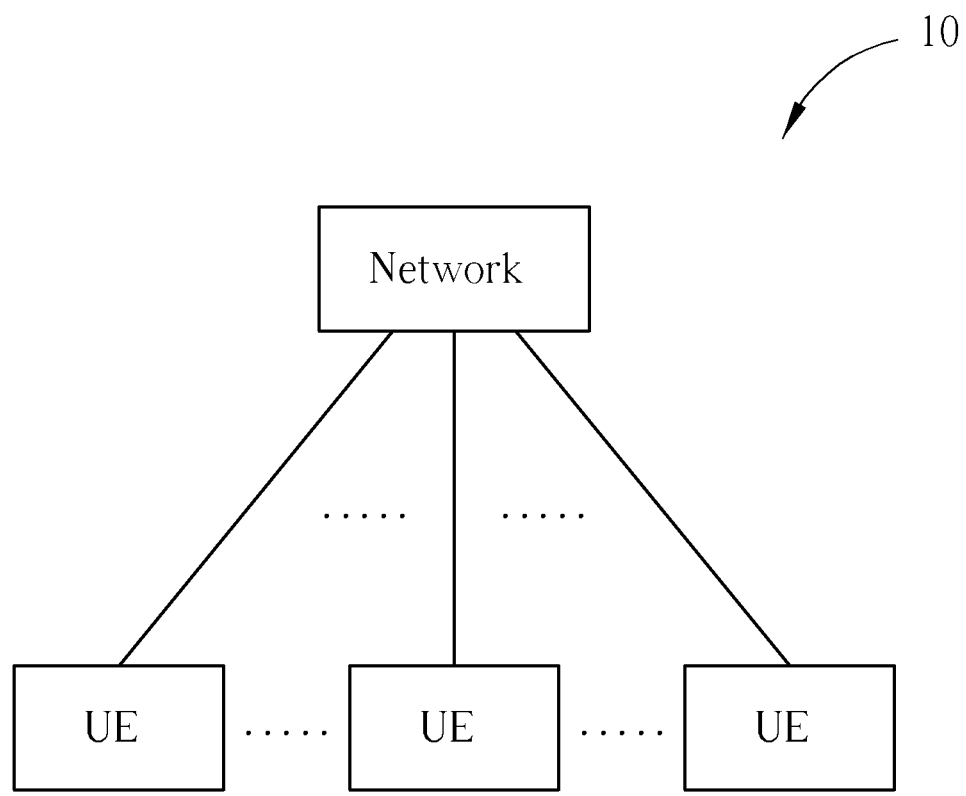
FIG. 1 is a schematic diagram of an exemplary wireless communication system.

Please refer to FIG. 1. FIG. 1 is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
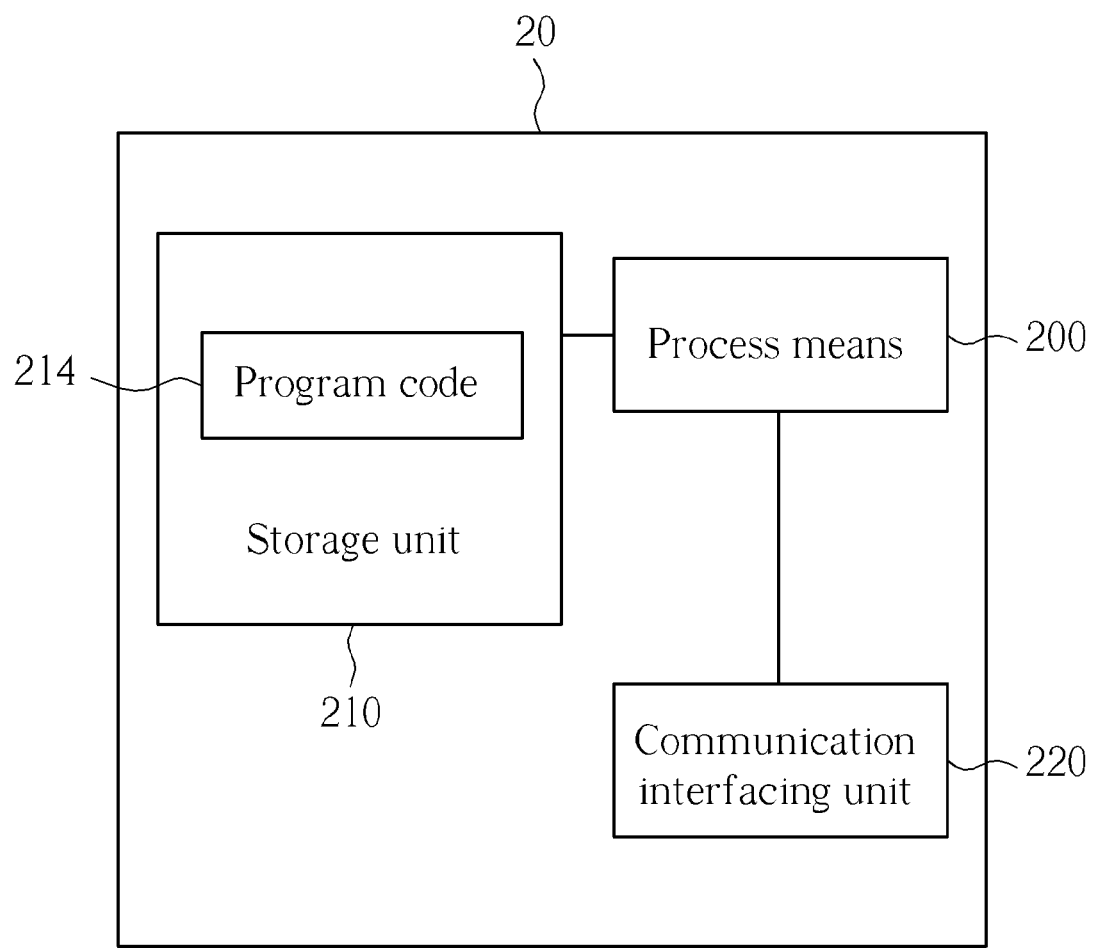
FIG. 2 is a schematic diagram of an exemplary communication device.

Please refer to FIG. 2. FIG. 2 is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
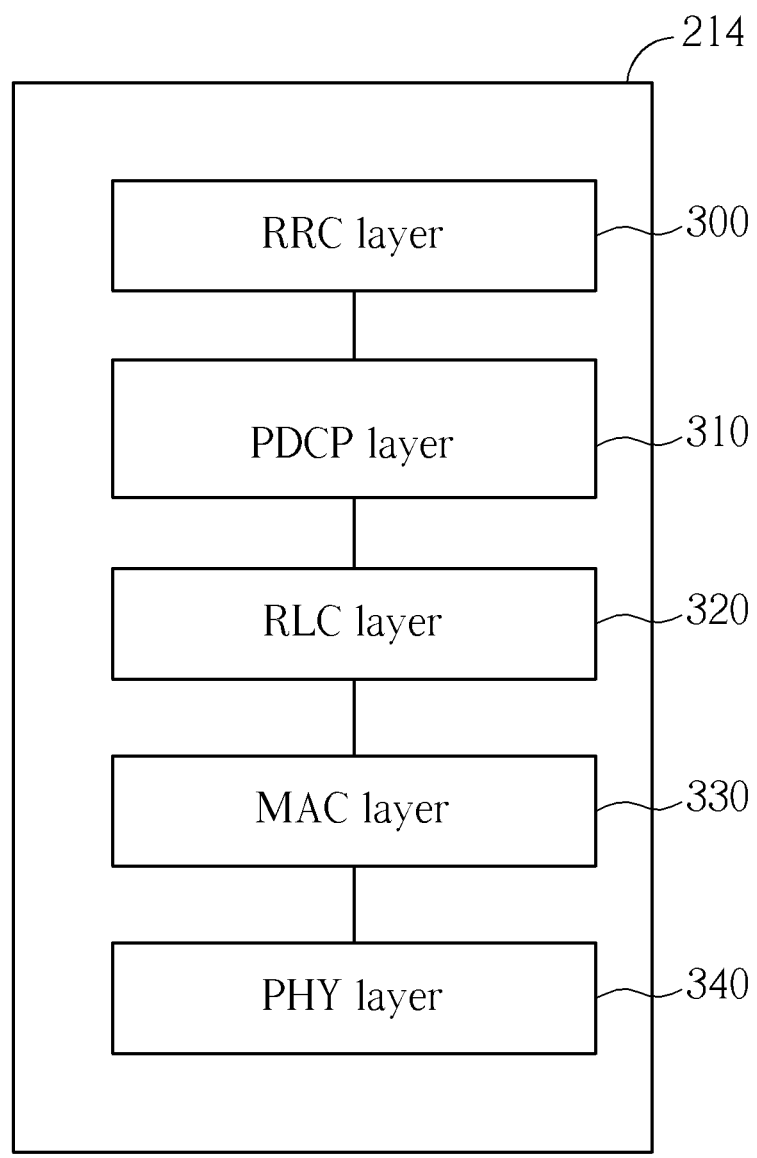
FIG. 3 illustrates the program code in FIG. 2.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. The PHY layer 340 includes physical channels, such as Physical Random Access Channel (PRACH), Physical Uplink Control Channel (PUCCH), Physical Uplink Shared Channel (PUCCH), Physical Downlink Control Channel (PDCCH), Physical Downlink Shared Channel (PDCCH).

In LTE-A system, the PHY layer 340 and the MAC layer 330 may support a Carrier Aggregation (CA) technology, which enables the UE to perform data transmission and/or reception through one or multiple component carriers. In such a situation, the embodiments of the present invention provide the program code 214 for the UE to efficiently perform uplink transmission.

Figure 4:
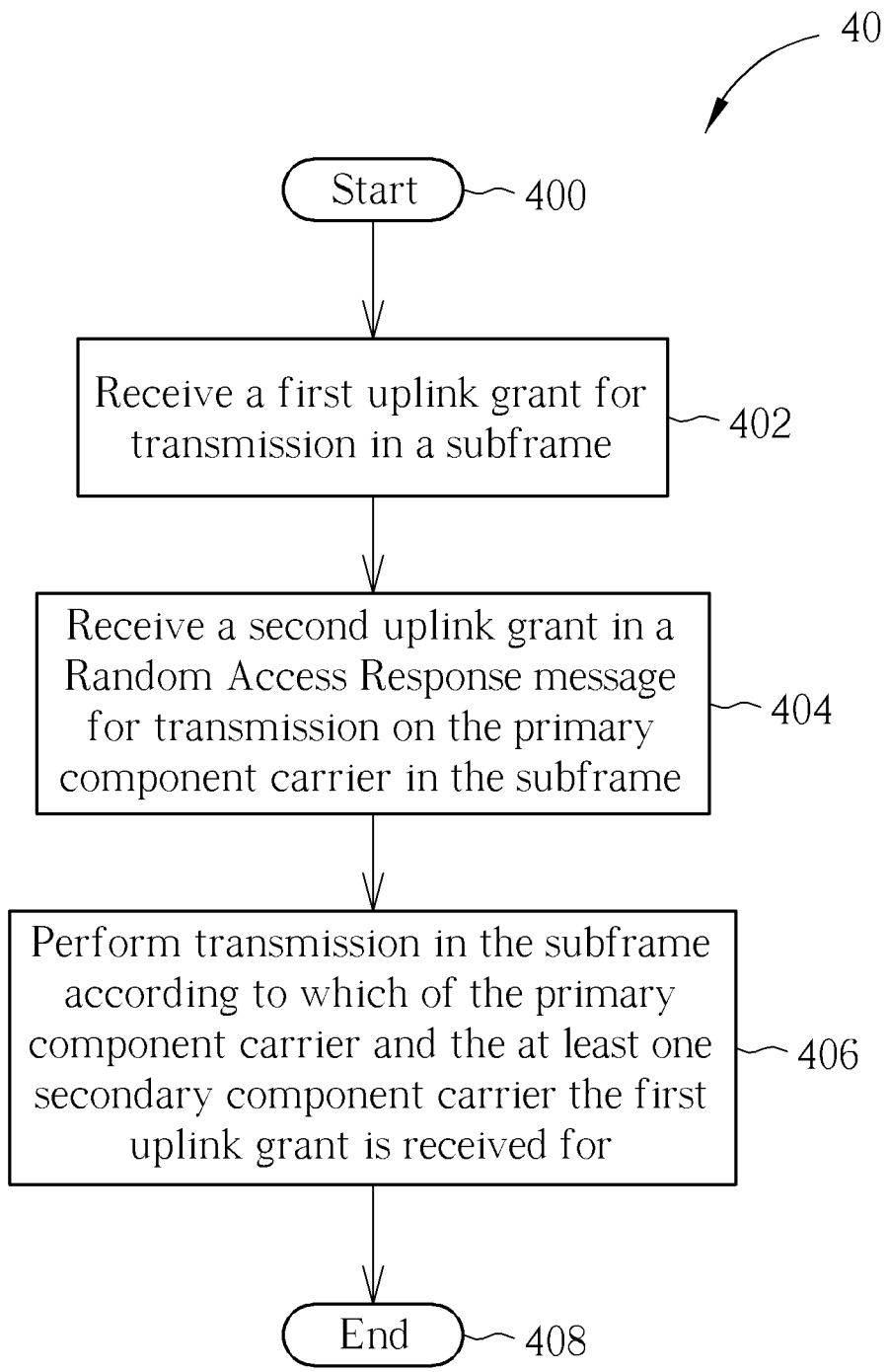
FIG. 4 is a flow chart of a process according to an embodiment of the present invention.

Please refer to FIG. 4, which is a flow chart of a process 40 according to an embodiment of the present invention. The process 40 is used for performing uplink transmission for a UE in a wireless communication system. The wireless communication system could be the wireless communication system 10, and the UE is configured with a primary component carrier and at least one secondary component carrier. The process 40 can be compiled into the program code 214 and includes the following steps:

Step 400: Start.

Step 402: Receive a first uplink grant for transmission in a subframe.

Step 404: Receive a second uplink grant in a Random Access Response message for transmission on the primary component carrier in the subframe.

Step 406: Perform transmission in the subframe according to which of the primary component carrier and the at least one secondary component carrier the first uplink grant is received for.

Step 408: End.

According to the process 40, the UE is configured with a primary component carrier, at least one secondary component carrier (e.g. corresponding to a PCell and at least one SCell). When the UE receives a first uplink grant for transmission in a subframe and receives a second uplink grant in a Random Access Response message for transmission on the primary component carrier in the same subframe, the UE performs transmission in the subframe according to which of the primary component carrier and the at least one secondary component carrier the first uplink grant is received for.

In detail, if the first uplink grant is received for one of the at least one secondary component carrier, the UE can transmit a first data block using the first uplink grant and a second data block using the second uplink grant in the same subframe since the first uplink grant and the second uplink grant are for transmissions on different component carriers (the secondary component carrier and the primary component carrier, respectively) in the same subframe. On the other hand, if the first uplink grant is received for the primary component carrier, the UE transmits the first data block using the first uplink grant or the second data block using the second uplink grant in the subframe since the first uplink grant and the second uplink grant are for transmissions on the same primary component carrier in the same subframe. As a result, the UE can perform transmissions in a subframe according to which component carrier the first uplink grant is received for, so as to perform transmissions required by the first uplink grant and the second uplink grant for different component carriers in the same subframe.

Figure 5:
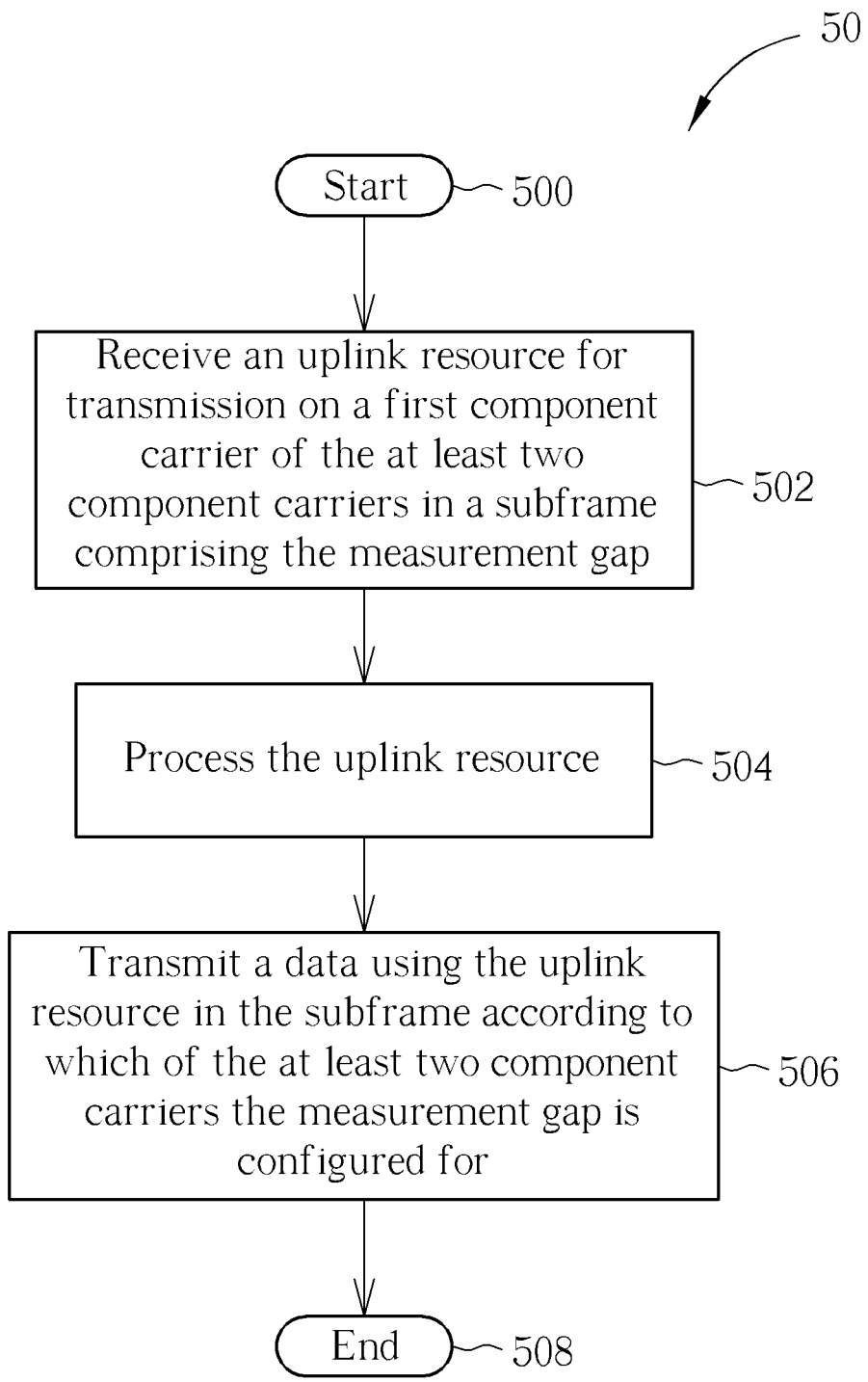
FIG. 5 is a flow chart of a process according to an embodiment of the present invention.

Please refer to FIG. 5, which is a flow chart of a process 50 according to an embodiment of the present invention. The process 50 is used for performing uplink transmission for a UE in a wireless communication system. The wireless communication system could be the wireless communication system 10, and the UE is configured with at least two component carriers and a measurement gap. The process 50 can be compiled into the program code 214 and includes the following steps:

Step 500: Start.

Step 502: Receive an uplink resource for transmission on a first component carrier of the at least two component carriers in a subframe comprising the measurement gap.

Step 504: Process the uplink resource.

Step 506: Transmit a data using the uplink resource in the subframe according to which of the at least two component carriers the measurement gap is configured for.

Step 508: End.

According to the process 50, the UE is configured with at least two component carriers, e.g. a primary component carrier, at least one secondary component carrier, and a measurement gap. When the UE receives an uplink resource for transmission on a first component carrier of the at least two component carriers in a subframe comprising the measurement gap, the UE processes the uplink resource for transmission information, and then transmits a data using the uplink resource in the subframe according to which of the at least two component carriers the measurement gap is configured for.

In detail, if the measurement gap is configured for a second component carrier of the at least two component carriers different from the first component carrier, the UE transmits the data using the uplink resource since the measurement gap and the uplink resource are for different component carriers. On the other hand, if the measurement gap is configured for the first component carrier, the UE does not transmit the data using the uplink resource since the measurement gap and the uplink resource are for the same component carrier. As a result, the UE can perform transmission in a subframe according to which component carrier a measurement gap is configured for, so as to perform transmission required by the uplink resource when the measurement gap and the uplink resource are for different component carriers.

Noticeably, in the process 50, the uplink resource and corresponding data are not limited to any specific type. For example, in one embodiment, the uplink resource can be an uplink grant received on PDCCH, and the data can comprise a Media Access Control (MAC) Protocol Data Unit (PDU); in another embodiment, the uplink resource can be a physical uplink control channel (PUCCH) resource, and the data can comprise at least one of a Hybrid Automatic Repeat Request (HARQ) feedback, Channel Quality Indicator (CQI), precoding matrix indicator (PMI), rank indication (RI), scheduling request (SR), and sounding reference signal (SRS).

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can enhance uplink transmission in the wireless communications system 10.

In the prior art, when the UE receive a first uplink grant on a PDCCH for a secondary component carrier during a random access procedure on the primary component carrier and receive a second uplink grant in a Random Access Response message for transmissions in a same subframe, the UE either chooses the first uplink grant on PDCCH or the second uplink grant in the Random Access Response message for transmission in the subframe, which is not efficient since only one transmission is allowed. On the other hand, when the UE have a measurement gap configuration for a secondary component carrier and a configured uplink grant indicating an UL-SCH transmission during the measurement gap for the primary component carrier, The UE does not perform the UL-SCH transmission, which wastes the configured uplink grant resources.

In comparison, in an embodiment of the present invention, the UE can perform transmissions in a subframe according to which component carrier the first uplink grant is received for, so as to perform transmissions required by the first uplink grant and the second uplink grant for different component carriers in the same subframe. In another embodiment of the present invention, the UE can perform transmission in a subframe according to which component carrier a measurement gap is configured for, so as to perform transmission required by the uplink resource when the measurement gap and the uplink resource are for different component carriers.

To sum up, the present invention can efficiently perform uplink transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing uplink transmission for a mobile device configured with a first component carrier and at least one second component carrier in a carrier aggregation wireless communication system, the method comprising:
the mobile device receiving a first uplink grant for transmission in a subframe;
the mobile device receiving a second uplink grant in a Random Access Response message for transmission on the first component carrier in said subframe; and
the mobile device performing transmission in said subframe according to which of the first component carrier and the at least one second component carrier the first uplink grant is received for.

2. The method of claim 1, wherein the step of the mobile device performing transmission in the subframe according to which of the first component carrier and the at least one second component carrier the first uplink grant is received for comprises:
the mobile device transmitting a first data block using the first uplink grant and a second data block using the second uplink grant in the subframe if the first uplink grant is received for one of the at least one second component carrier.

3. The method of claim 1, wherein the step of the mobile device performing transmission in the subframe according to which of the first component carrier and the at least one second component carrier the first uplink grant is received for comprises:
the mobile device transmitting a first data block using the first uplink grant or a second data block using the second uplink grant in the subframe if the first uplink grant is received for the first component carrier.

4. A method of performing uplink transmission for a mobile device configured with at least two component carriers and a measurement gap in a carrier aggregation wireless communication system, the method comprising:
the mobile device receiving an uplink resource for transmission on a first component carrier of the at least two component carriers in a subframe in the measurement gap, wherein the measurement gap is configured for one of the at least two component carriers;
the mobile device processing the uplink resource; and
the mobile device transmitting a data using the uplink resource in said subframe according to which of the at least two component carriers the measurement gap is configured for.

5. The method of claim 4, wherein the step of the mobile device transmitting the data using the uplink resource in the subframe according to which of the at least two component carriers the measurement gap is configured for comprises:
the mobile device transmitting the data using the uplink resource if the measurement gap is configured for a second component carrier of the at least two component carriers different from the first component carrier.

6. The method of claim 4, wherein the step of the mobile device transmitting the data using the uplink resource in the subframe according to which of the at least two component carriers the measurement gap is configured for comprises:
the mobile device not transmitting the data using the uplink resource if the measurement gap is configured for the first component carrier.

7. The method of claim 4, wherein the uplink resource is an uplink grant received on PDCCH, and the data comprises a Media Access Control (MAC) Protocol Data Unit (PDU).

8. The method of claim 4, wherein the uplink resource is a physical uplink control channel (PUCCH) resource, and the data comprises at least one of a Hybrid Automatic Repeat Request (HARD) feedback, Channel Quality Indicator (CQI), precoding matrix indicator (PMI), rank indication (RI), scheduling request (SR), and sounding reference signal (SRS).

9. A communication device of a carrier aggregation wireless communication system for performing uplink transmission, the communication device configured with a first component carrier and at least one second component carrier, and comprising:
a processing means for executing a program; and
a memory unit coupled to the processing means for storing the program; wherein
the program instructs the processing means to perform the following steps:
receiving a first uplink grant for transmission in a subframe;
receiving a second uplink grant in a Random Access Response message for transmission on the first component carrier in said subframe; and
performing transmission in said subframe according to which of the first component carrier and the at least one second component carrier the first uplink grant is received for.

10. The communication device of claim 9, wherein performing transmission in the subframe according to which of the first component carrier and the at least one second component carrier the first uplink grant is received for comprises:
transmitting a first data block using the first uplink grant and a second data block using the second uplink grant in the subframe if the first uplink grant is received for one of the at least one second component carrier.

11. The communication device of claim 9, wherein performing transmission in the subframe according to which of the first component carrier and the at least one second component carrier the first uplink grant is received for comprises:
transmitting a first data block using the first uplink grant or a second data block using the second uplink grant in the subframe if the first uplink grant is received for the first component carrier.

12. A communication device of a carrier aggregation wireless communication system for performing uplink transmission, the communication device configured with at least two component carriers and a measurement gap, and comprising:
- a processing means for executing a program; and
- a memory unit coupled to the processing means for storing the program; wherein
  - the program instructs the processing means to perform the following steps:
  - receiving an uplink resource for transmission on a first component carrier of the at least two component carriers in a subframe in the measurement gap, wherein the measurement gap is configured for one of the at least two component carriers;
  - processing the uplink resource; and
  - transmitting a data using the uplink resource in said subfram according to which of the at least two component carriers the measurement gap is configured for.

13. The communication device of claim 12, wherein transmitting the data using the uplink resource in the subframe according to which of the at least two component carriers the measurement gap is configured for comprises:
- transmitting the data using the uplink resource if the measurement gap is configured for a second component carrier of the at least two component carriers different from the first component carrier.

14. The communication device of claim 12, wherein transmitting the data using the uplink resource in the subframe according to which of the at least two component carriers the measurement gap is configured for comprises:
- transmitting the data using the uplink resource if the measurement gap is configured for the first component carrier.

15. The communication device of claim 12, wherein the uplink resource is an uplink grant received on PDCCH, and the data comprises a Media Access Control (MAC) Protocol Data Unit (PDU).

16. The communication device of claim 12, wherein the uplink resource is a physical uplink control channel (PUCCH) resource, and the data comprises at least one of a Hybrid Automatic Repeat Request (HARQ) feedback, Channel Quality Indicator (CQI), precoding matrix indicator (PMI), rank indication (RI), scheduling request (SR), and sounding reference signal (SRS).

* * * * *